(12) United States Patent
Smith et al.

(10) Patent No.: US 8,346,770 B2
(45) Date of Patent: *Jan. 1, 2013

(54) SYSTEMS AND METHODS FOR CLUSTERING SEARCH RESULTS

(75) Inventors: Adam Smith, Mountain View, CA (US);
Xianping Ge, Sunnyvale, CA (US);
Elizabeth Hamon, Harrisville, NH (US);
Abhishck Parmar, San Jose, CA (US)

(73) Assignee: Google Inc., Mountain View, CA (US)

( * ) Notice: Subject to any disclaimer, the term of this patent is extended or adjusted under 35 U.S.C. 154(b) by 1827 days.

This patent is subject to a terminal disclaimer.

(21) Appl. No.: 10/664,929

(22) Filed: Sep. 22, 2003

(65) Prior Publication Data

US 2005/0065959 A1  Mar. 24, 2005

(51) Int. Cl.
*G06F 17/30* (2006.01)

(52) U.S. Cl. ......... 707/737; 707/724; 707/748; 707/771

(58) Field of Classification Search ................. 707/3
See application file for complete search history.

(56) References Cited

U.S. PATENT DOCUMENTS

| | | | | |
|---|---|---|---|---|
| 6,101,496 | A  * | 8/2000 | Esposito | 1/1 |
| 2001/0011270 | A1 | 8/2001 | Himmelstein et al. | 707/3 |
| 2002/0042789 | A1 * | 4/2002 | Michalewicz et al. | 707/3 |
| 2002/0078035 | A1 | 6/2002 | Frank et al. | 707/3 |
| 2002/0087505 | A1 | 7/2002 | Smith et al. | 707/1 |
| 2003/0061211 | A1 * | 3/2003 | Shultz et al. | 707/3 |
| 2003/0217052 | A1 * | 11/2003 | Rubenczyk et al. | 707/3 |

FOREIGN PATENT DOCUMENTS

| | | |
|---|---|---|
| EP | 0 860 786 | 8/1998 |
| KR | 2002-0046494 A | 6/2002 |
| KR | 10-0763004 | 10/2007 |
| WO | WO 01/40968 | 6/2001 |
| WO | WO 01/65426 | 9/2001 |
| WO | WO 01/75728 | 10/2001 |

OTHER PUBLICATIONS

Han, Jiawei, et al, "GeoMiner: A System Prototype for Spatial Data Mining," 1997, SIGMOD '97, pp. 553-556.*
Watter, Carolyn, "GeoSearch: Location-Based Ranking of Search Engine Results," 2003, Journal of the American Society for Information Science and Technology, pp. 140-151.*

(Continued)

*Primary Examiner* — Farhan Syed
(74) *Attorney, Agent, or Firm* — Harrity & Harrity, LLP

(57) ABSTRACT

A system forms search results clustered by address or telephone number. When clustering by address, the system may receive a search query and identify a geographical area of interest based, at least in part, on the search query. The system may identify documents that are associated with addresses located within the geographical area of interest, group the identified documents into clusters based, at least in part, on the addresses located within the geographical area of interest, and present the clusters as the search results. When clustering by telephone number, the system may receive a search query that includes at least one portion of a telephone number and identify documents that are associated with telephone numbers that match the at least one portion of the telephone number. The system may group the identified documents into clusters based on the telephone numbers included in the identified documents and present the clusters as the search results.

27 Claims, 8 Drawing Sheets

OTHER PUBLICATIONS

Ooi, Beng Chin, et al., "Indexing in Spatial Databases," 1991, http://www.comp.nus.edu.sg/~ooibc/papers/survey.ps, pp. 1-71.*

Papadias, Dimitris, et al., "Query Processing in Spatial Network Databases," ACM, Proceedings of the 29th VLDB Conference, 2003, pp. 1-12.*

Co-pending U.S. Appl. No. 10/664,902; entitled "Address Geocoding"; filed on Sep. 22, 2003; 31 pages.

Co-pending U.S. Appl. No. 10/665,359; entitled "Determining Geographical Relevance of Web Documents"; filed on Sep. 22, 2003; 38 pages.

Google News; http://news.google.com/news; (print date Jan. 22, 2004); 1 page.

International Search Report and Written Opinion for corresponding PCT application with a mailing date of Feb. 18, 2005, 11 pages.

Peter Ingwersen, "Information Retrieval Interaction", www.db.dk/pi, 1992, 256 pages.

Money Today, "[News] Netpia Started Living Information Retrieval Service", Jul. 11, 2000, 3 pages. (English summary included).

* cited by examiner

FIG. 3

| DOCUMENT | ADDRESS |
|---|---|
| DOC_1 | ADDRESS_1 |
| DOC_1 | ADDRESS_2 |
| ... | ... |
| DOC_1 | ADDRESS_K |
| DOC_2 | ADDRESS_J |
| ... | ... |
| DOC_2 | ADDRESS_K |
| ... | ... |
| DOC_2 | ADDRESS_L |
| ... | ... |
| DOC_M | ADDRESS_N |

300 — 
310 — DOCUMENT
320 — ADDRESS

SYSTEMS AND METHODS FOR CLUSTERING SEARCH RESULTS

BACKGROUND OF THE INVENTION

1. Field of the Invention

The present invention relates generally to information retrieval systems and, more particularly, to systems and methods for clustering search results by address and/or telephone number.

2. Description of Related Art

The World Wide Web ("web") contains a vast amount of information. Locating a desired portion of the information, however, can be challenging. This problem is compounded because the amount of information on the web and the number of new users inexperienced at web searching are growing rapidly. Search engines attempt to return hyperlinks to web documents in which a user is interested. Generally, search engines base their determination of the user's interest on search terms (called a search query) entered by the user. The goal of the search engine is to provide links to high quality, relevant results to the user based on the search query. Typically, the search engine accomplishes this by matching the terms in the search query to a corpus of pre-stored web documents. Web documents that contain the user's search terms are "hits" and are returned to the user.

Some web documents may be of particular interest to users that reside in certain geographical areas. For example, web documents associated with local businesses or organizations may be of most relevance to individuals located in the geographical area of the local businesses/organizations.

When a user desires information regarding a type of business (e.g., a restaurant, a hardware store, a pharmacy, etc.) within a certain geographical area, the user may provide one or more keywords associated with the business type and the geographical area to a search engine. The search engine returns search results that include web documents associated with the business type.

One problem with these search results is that the search results typically will not include web documents associated with businesses or organizations outside the geographical area identified by the user, even if these businesses or organizations are located in an area geographically close (or next) to the geographical area identified by the user. Another problem with these search results is that the search results typically include more than one, and oftentimes many, web documents associated with the same business location, possibly requiring the user to peruse many web documents in the search results that are irrelevant to the business of interest before locating all of the web documents associated with the business of interest.

As a result, there is a need for systems and methods for organizing search results in a manner that is meaningful to users, given that there are a set number of unique locations in the world and anywhere between zero and hundreds of web documents that describe each location.

SUMMARY OF THE INVENTION

Systems and methods, consistent with the principles of the invention, cluster web documents based at least in part on addresses (or telephone numbers) included in the web documents.

In accordance with one aspect consistent with the principles of the invention, a method for clustering by address is provided. The method may include receiving a search query, identifying a geographical area of interest based, at least in part, on the search query, and identifying documents that include addresses located within the geographical area of interest. The method may also include grouping the identified documents into clusters based, at least in part, on the addresses located within the geographical area of interest and presenting the clusters.

According to another aspect, a system for forming search results is provided. The system may include a processor and a memory configured to store information that associates documents to addresses included in the documents. The processor is configured to receive a search query, determine a geographical area of interest based, at least in part, on the search query, and identify documents that include addresses located within the geographical area of interest based, at least in part, on the information stored in the memory. The processor is also configured to group the identified documents into clusters based, at least in part, on the addresses located within the geographical area of interest and provide the clusters as the search results.

According to yet another aspect, a method for forming search results is provided. The method may include receiving a search query that includes at least one portion of a telephone number and identifying documents that include telephone numbers that match the at least one portion of the telephone number. The method may also include grouping the identified documents into clusters based on the telephone numbers included in the identified documents and presenting the clusters as the search results.

According to a further aspect, a system for forming search results is provided. The system may include means for receiving a search query, means for identifying a geographical location, means for determining a geographical center of the geographical location, and means for identifying locations within a certain distance of the geographical center as a geographical area of interest. The system may also include means for identifying documents that include addresses located within the geographical area of interest and means for determining relevant ones of the identified documents, as relevant documents, based, at least in part, on the search query. The relevant documents may form the search results.

BRIEF DESCRIPTION OF THE DRAWINGS

The accompanying drawings, which are incorporated in and constitute a part of this specification, illustrate an embodiment of the invention and, together with the description, explain the invention. In the drawings.

FIG. 3 is a diagram of an exemplary computer-readable medium that may be used by a server of FIG. 1 according to an implementation consistent with the principles of the invention;

DETAILED DESCRIPTION

The following detailed description of the invention refers to the accompanying drawings. The same reference numbers in different drawings may identify the same or similar elements. Also, the following detailed description does not limit the invention.

Systems and methods consistent with the principles of the invention may provide search results that are clustered by address (or telephone number) to provide search results that are meaningful to users looking for information associated with particular geographic locations. The search results may also be more meaningful to the users because they may include information associated with other geographic locations that are geographically close (or next) to the geographic locations in which the users are interested.

Exemplary Network Configuration

Figure 1:
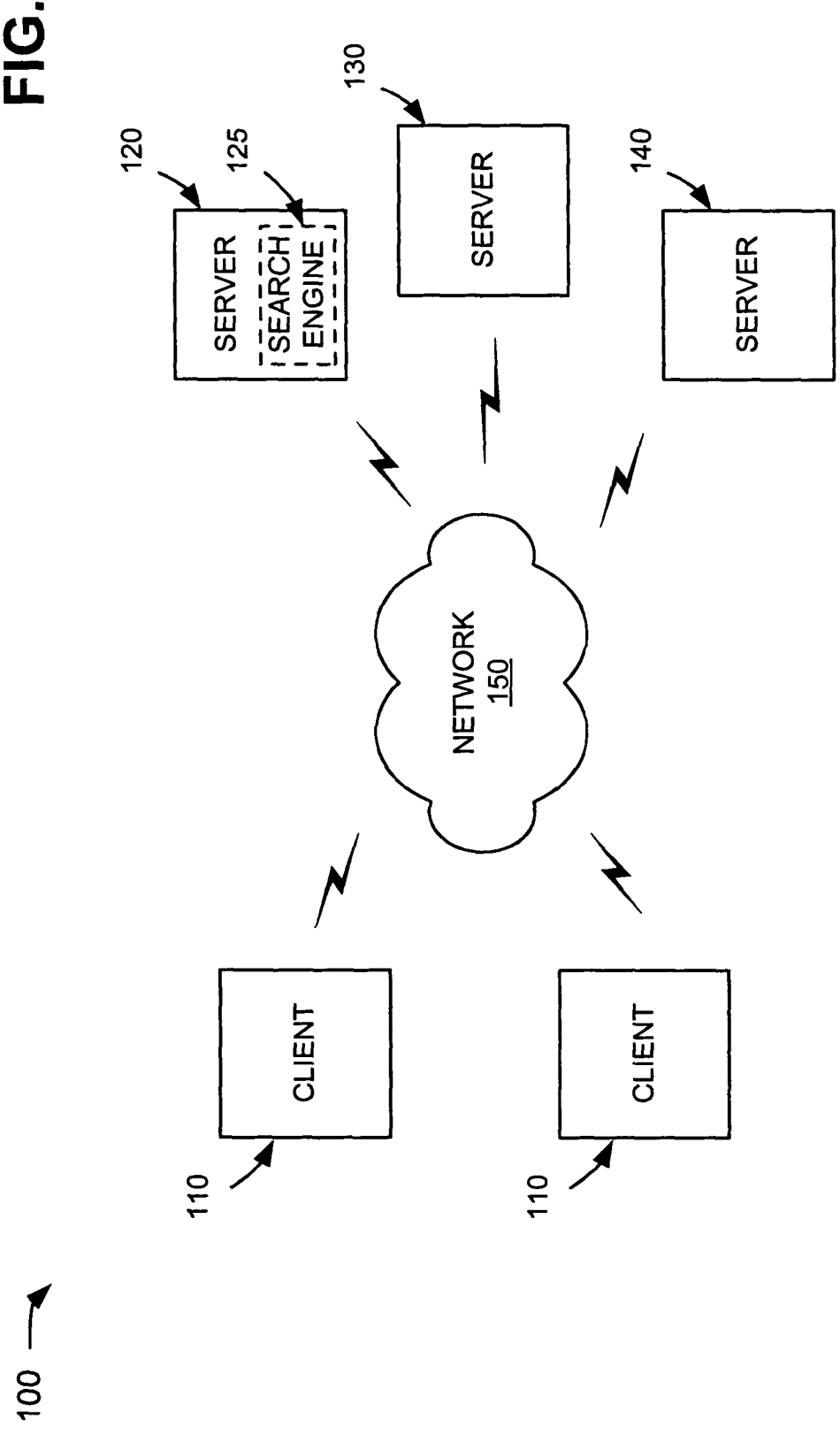
FIG. 1 is a diagram of an exemplary network in which systems and methods consistent with the principles of the invention may be implemented.

FIG. 1 is an exemplary diagram of a network 100 in which systems and methods consistent with the principles of the invention may be implemented. Network 100 may include multiple clients 110 connected to multiple servers 120-140 via a network 150. Network 150 may include a local area network (LAN), a wide area network (WAN), a telephone network, such as the Public Switched Telephone Network (PSTN), an intranet, the Internet, a memory device, another type of network, or a combination of networks. Two clients 110 and three servers 120-140 have been illustrated as connected to network 150 for simplicity. In practice, there may be more or fewer clients and servers. Also, in some instances, a client may perform the functions of a server and a server may perform the functions of a client.

Clients 110 may include client entities. An entity may be defined as a device, such as a wireless telephone, a personal computer, a personal digital assistant (PDA), a lap top, or another type of computation or communication device, a thread or process running on one of these devices, and/or an object executable by one of these device. Servers 120-140 may include server entities that gather, process, search, and/or maintain documents in a manner consistent with the principles of the invention. Clients 110 and servers 120-140 may connect to network 150 via wired, wireless, and/or optical connections.

In an implementation consistent with the principles of the invention, server 120 may optionally include a search engine 125 usable by clients 110. Server 120 may crawl documents (e.g., web pages) and store information associated with these documents in a repository of crawled documents. Servers 130 and 140 may store or maintain documents that may be crawled by server 120. While servers 120-140 are shown as separate entities, it may be possible for one or more of servers 120-140 to perform one or more of the functions of another one or more of servers 120-140. It may be possible that two or more of servers 120-140 are implemented as a single server or that one of servers 120-140 is implemented as multiple computing devices.

Exemplary Client/Server Architecture

Figure 2:
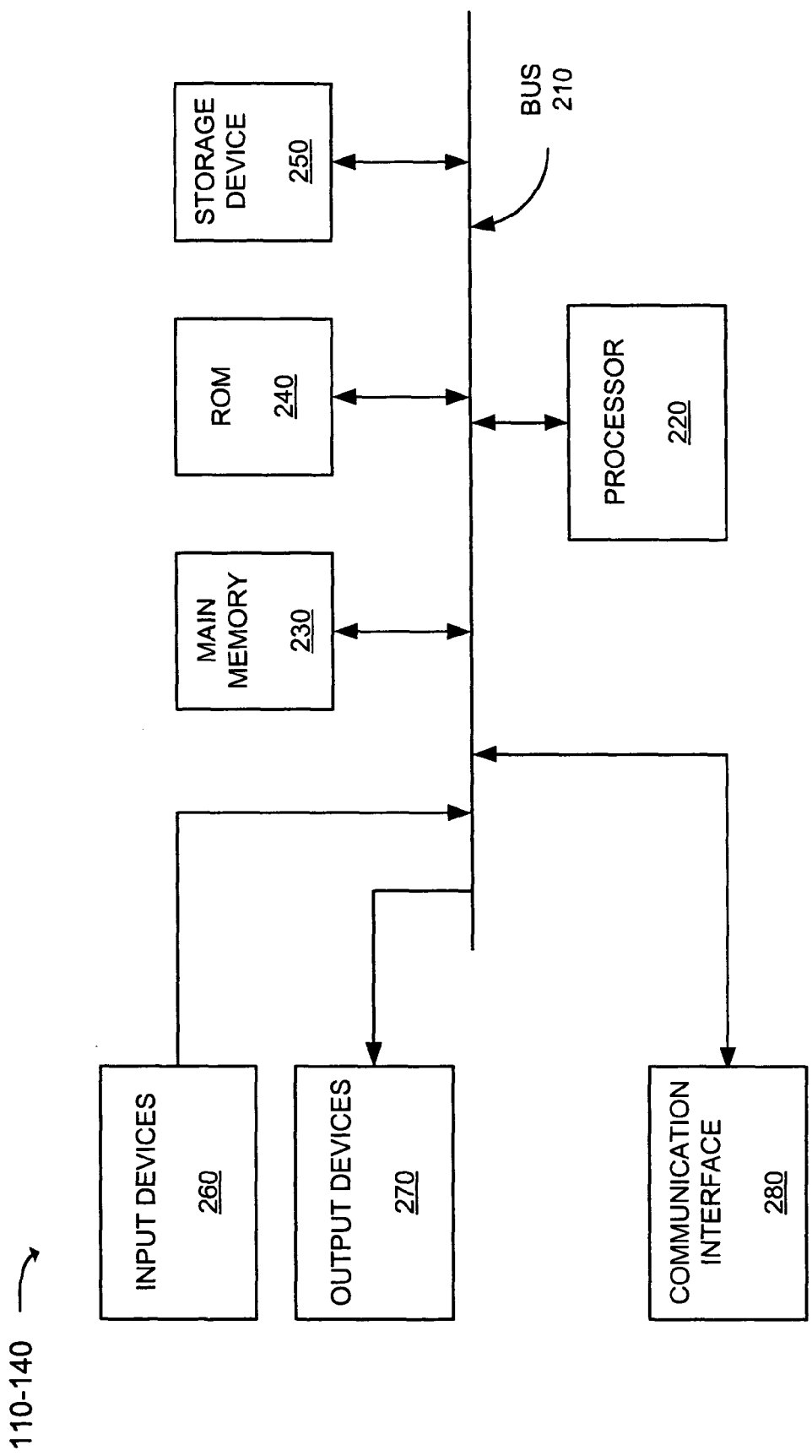
FIG. 2 is an exemplary diagram of a client and/or server of FIG. 1 in an implementation consistent with the principles of the invention.

FIG. 2 is an exemplary diagram of a client or server entity (hereinafter called "client/server entity"), which may correspond to one or more of clients 110 and servers 120-140, according to an implementation consistent with the principles of the invention. The client/server entity may include a bus 210, a processor 220, a main memory 230, a read only memory (ROM) 240, a storage device 250, one or more input devices 260, one or more output devices 270, and a communication interface 280. Bus 210 may include one or more conductors that permit communication among the components of the client/server entity.

Processor 220 may include any type of conventional processor or microprocessor that interprets and executes instructions. Main memory 230 may include a random access memory (RAM) or another type of dynamic storage device that stores information and instructions for execution by processor 220. ROM 240 may include a conventional ROM device or another type of static storage device that stores static information and instructions for use by processor 220. Storage device 250 may include a magnetic and/or optical recording medium and its corresponding drive.

Input device(s) 260 may include one or more conventional mechanisms that permit an operator to input information to the client/server entity, such as a keyboard, a mouse, a pen, voice recognition and/or biometric mechanisms, etc. Output device(s) 270 may include one or more conventional mechanisms that output information to the operator, including a display, a printer, a speaker, etc. Communication interface 280 may include any transceiver-like mechanism that enables the client/server entity to communicate with other devices and/or systems. For example, communication interface 280 may include mechanisms for communicating with another device or system via a network, such as network 150.

As will be described in detail below, the client/server entity, consistent with the principles of the invention, perform certain searching-related operations. The client/server entity may perform these operations in response to processor 220 executing software instructions contained in a computer-readable medium, such as memory 230. A computer-readable medium may be defined as one or more physical or logical memory devices and/or carrier waves.

The software instructions may be read into memory 230 from another computer-readable medium, such as data storage device 250, or from another device via communication interface 280. The software instructions contained in memory 230 causes processor 220 to perform processes that will be described later. Alternatively, hardwired circuitry may be used in place of or in combination with software instructions to implement processes consistent with the principles of the invention. Thus, implementations consistent with the principles of the invention are not limited to any specific combination of hardware circuitry and software.

Exemplary Computer-Readable Medium

FIG. 3 is a diagram of an exemplary computer-readable medium that may be associated with a server, such as server 120 in FIG. 1, according to an implementation consistent with the principles of the invention. The contents of computer-readable medium may physically reside in one or more memory devices accessible by server 120.

Computer-readable medium may include a database 300 of entries corresponding to documents with associated addresses (e.g., postal addresses). For example, server 120 may analyze a repository of crawled documents to locate documents that contain one or more addresses. Server 120 may then identify and extract the addresses from the documents using a technique, such as the one described in U.S. patent application, Ser. No. 10/664,902, entitled "ADDRESS GEOCODING," filed concurrently herewith, and incorporated herein by reference. In another implementation, the addresses could be manually extracted from the documents.

In yet another implementation, an address associated with a document may be inferred from other information sources. For example, the geographical locations of people accessing the document may be used to infer the address of the document. The geographical locations of the people accessing the document may be determined based on their IP addresses. If most of the people accessing a document are in the same town, it can be inferred that the document has an address associated with the town. A business name included in the document may also be used to infer the address of the document. From the business name, an address may be determined using, for example, yellow page data. The geographical location of the server hosting the document may also be used to infer the address of the document. These and other techniques for inferring an address in a document are described in U.S. patent application, Ser. No. 10/665,359, entitled "DETERMINING GEOGRAPHICAL RELEVANCE OF WEB DOCUMENTS," filed concurrently herewith, and incorporated herein by reference. In any event, server 120 may use these addresses to populate database 300.

Each of the entries in database 300 may include a document identifier field 310 and an address field 320, which may be separately searchable. In other implementations consistent with the principles of the invention, the entries in database 300 may include more fields, such as additional address fields, and/or different fields, such as telephone number fields and/or fields for latitude and longitude coordinates corresponding to the information in address field 320.

Document identifier field 310 may include information that uniquely identifies documents. In one implementation, document identifier field 310 includes a uniform resource locator (URL) associated with a document. Address field 320 may include information regarding an address associated with the corresponding document. It may be beneficial to note that the same address may be associated with more than one document. For example, as shown in FIG. 3, address_K is associated with document doc_1 and document doc_2. In other words, there may be between zero and hundreds of documents that have the same associated address.

Exemplary Processing

Figure 4A:
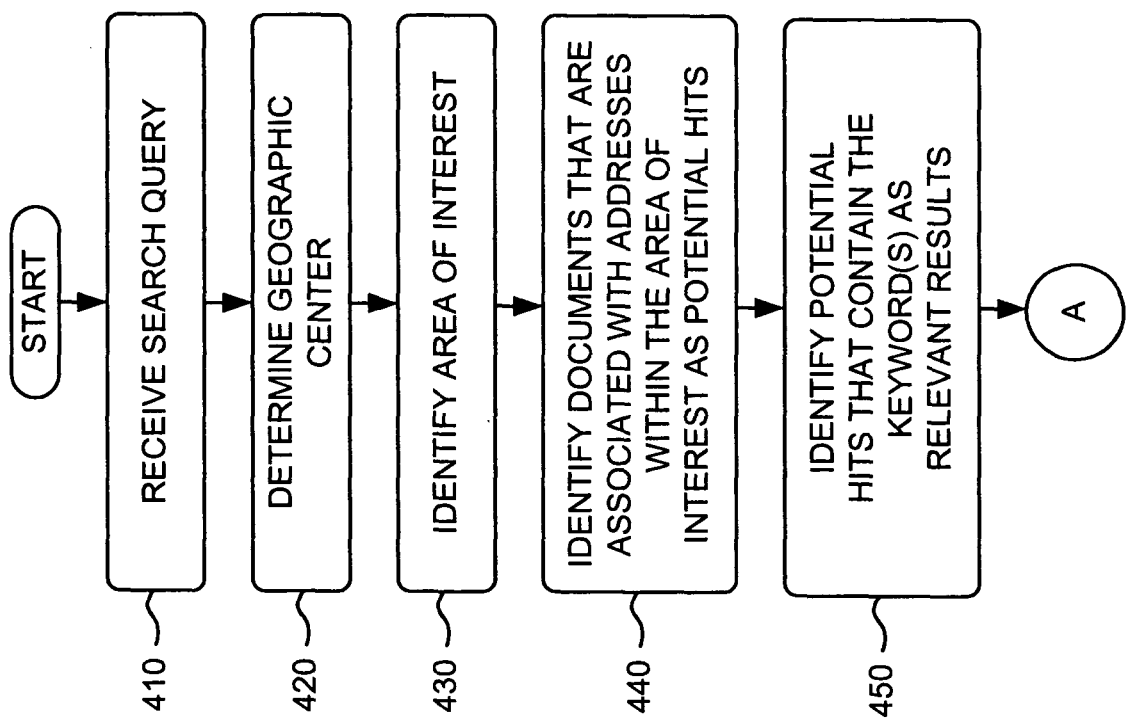
FIGS. 4A and 4B are flowcharts of exemplary processing for clustering search results by address according to an implementation consistent with the principles of the invention.
Figure 4B:
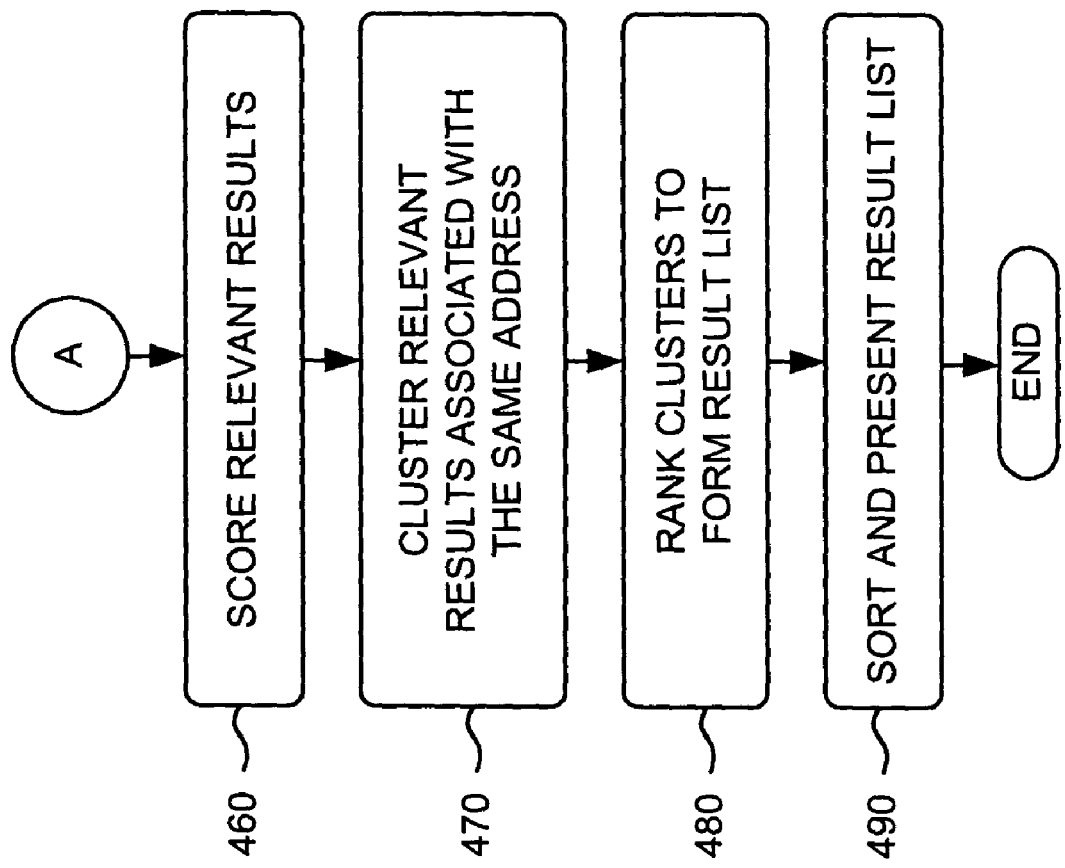

FIGS. 4A and 4B are flowcharts of exemplary processing for clustering search results by address according to an implementation consistent with the principles of the invention. Processing may begin with server 120 receiving a search query from a user (act 410) (FIG. 4A). For example, a user may use conventional web browser software on client 110 to access search engine 125 of server 120. The user may then enter the search query via a graphical user interface provided by server 120.

The search query may take different forms. For example, the search query may include one or more keywords relating to a business or organization in which the user is interested and, possibly, one or more geographical identifiers relating to a location at which the business or organization is located. The keyword(s) may include term(s) associated with the business or organization in which the user is interested. For example, if the user is looking for a pharmacy, the user may include the term "pharmacy" as a keyword. Likewise, if the user is looking for restaurants that serve pizza, the user may include the term "pizza" as a keyword.

The geographical identifier(s) may include location-specific information that approximately identifies the location of the business or organization in which the user is interested. The geographical identifier(s) may include information, such as an entire or partial address or an entire or partial telephone number associated with a business or organization of interest. For example, the user might specify address-specific data, such as the state, city, zip code, street name, or some combination of this information. Alternatively, the user might specify telephone-specific data, such as the area code, prefix, or some combination of this information.

Both the address-specific data and the telephone-specific data include information by which server 120 may determine a geographic location. The geographic location may be as broad as a state, city, zip code, or area code or as specific as a street address or area code and prefix. Server 120 may determine a geographic center of the geographic location (act 420). For example, if the user specified "Palo Alto," then server 120 may identify the geographic center of Palo Alto. Likewise, if the user specified the zip code 22030, then server 120 may identify the geographic center of the region covered by that zip code. Server 120 may express the geographic center in terms of its latitude and longitude coordinates.

In other implementations, server 120 may identify a relevant geographic center based on information other than that explicitly provided by the user. For example, the user's IP address or past browsing history may be used to estimate a geographic center. Alternatively, the user may register a "home" location of the user with server 120.

Server 120 may then identify an area that covers locations within a certain distance of the geographic center as an area of interest (act 430). For example, sever 120, in effect, may draw a circle with a certain radius around the geographic center and identify the area within the circle as the area of interest. The radius may be a predetermined radius, such as 5 miles or 10 miles. In another implementation, server 120 may determine the radius based, at least in part, on the specificity of the geographical identifier(s). For example, server 120 may provide a smaller radius when the geographical identifier(s) correspond to a specific address (e.g., a street address) and a larger radius when the geographical identifier(s) correspond to a very broad address (e.g., a state). In yet another implementation, server 120 may permit the user to define the radius. This may be a dynamic feature. For example, if the user is unhappy with the search results (e.g., the search results provide too many or too few results), the user may be permitted to either increase or decrease the radius. In a further implementation, the size of the radius may be dynamically set based on the type of the keyword(s) provided by the user. For example, the radius may be set at 5 miles for a restaurant search and 20 miles for a car dealership search.

Instead of using a radius, server 120 may use driving distance to identify the area of interest. Alternatively, server 120 may use distance (either straight line distance or driving distance) to a driving route to identify the area of interest. For example, server 120 may specify the area of interest as "along Highway 101 when driving from Mountain View to San Francisco." Server 120 might use yet other ways to identify the area of interest.

Server 120 may identify documents that are associated with one or more addresses located within the area of interest as potential "hits" (act 440). For example, server 120 may use a database that matches documents from the repository of crawled documents to their associated addresses, such as database 300 (FIG. 3), to identify documents that are associated with one or more addresses located within the area of interest. To facilitate the document identification, server 120 may search database 300 for addresses that fall within the area of interest and then identify the documents associated with these addresses.

Server 120 may then identify documents, of the potential hits, that include the one or more keywords provided by the user, as relevant results (act 450). For example, server 120 may analyze the words within the documents and determine whether these words match the one or more keywords. Documents that have words that match the one or more keywords may be classified as relevant results.

In another implementation consistent with the principles of the invention, acts 440 and 450 may be reversed. For example, server 120 may determine documents matching the one or more keywords and then determine which of these documents are associated with an address within the area of interest. In yet another implementation, acts 440 and 450 may be performed concurrently. In this case, server 120 may determine the intersection of the two-separately identified groups of documents to identify the documents that are associated with an address within the area of interest. In any event, a set of documents may be identified as relevant results.

Server 120 may score the relevant results (act 460) (FIG. 4B). Server 120 may use different factors in scoring the relevant results. For example, server 120 may consider distance and/or relevancy when determining the score for a document. Distance may refer to the distance that the address of a document is from the geographic center. Documents associated with addresses closer to the geographic center may be given a higher score than documents associated with addresses further from the geographic center. Relevancy may refer to the number of the keywords that the document contains and/or how prominently the one or more keywords are presented in the document. Documents containing all of the one or more keywords may be given a higher score than documents containing fewer than all of the one or more keywords. Documents containing the one or more keywords in a more prominent location, such as in a title, may be given a higher score than documents containing the one or more keywords in a less prominent location, such as in fine print.

Server 120 may cluster documents, of the relevant results, associated with the same address (act 470). To facilitate this, server 120 may optionally sort the documents based on their scores. Server 120 may consider an address associated with a first one of the documents (e.g., a highest scoring document) and determine whether there are any other documents that are associated with this same address. Server 120 may then cluster these documents together, as being associated with the same address. Server 120 may then consider another address associated with the first document, if there is one that is also located within the area of interest, or an address associated with a second one of the documents (e.g., a next highest scoring document) and determine whether there are any other documents that are associated with this same address. Server 120 may then cluster these documents together. Server 120 may continue until all of the documents have been included in at least one cluster, even if the cluster is a cluster of one (which would occur when the document is associated with an address that is not associated with any other document). Server 120 may sort the documents within each of the clusters based on their scores, if they are not already in order from an earlier sorting (described above).

Server 120 may rank the clusters to form a result list (act 480). Server 120 may use different factors in ranking the clusters. For example, server 120 may consider distance and relevancy when ranking the clusters. Distance for a cluster may refer to the distance that the address associated with the cluster is from the geographic center. Clusters with addresses closer to the geographic center may be ranked higher than clusters with addresses further from the geographic center.

Relevancy for a cluster may refer to the number of the keywords that the documents in the cluster contain and/or how prominently the one or more keywords are presented in the documents. When considering the documents in a cluster, server 120 may consider a predetermined number (e.g., one, three, all, etc.) of the highest scoring documents in the cluster. Clusters with document(s) containing all of the one or more keywords may be ranked higher than clusters with document(s) containing fewer than all of the one or more keywords. Further, clusters with document(s) containing the one or more keywords in a more prominent location, such as in a title, may be ranked higher than clusters with documents containing the one or more keywords in a less prominent location, such as in fine print.

Server 120 may give more weight to either distance or relevancy based at least in part, for example, on the specificity of the geographical identifier(s). For example, if the geographical identifier(s) are broad (e.g., the geographical identifier(s) correspond to a large geographical area, such as a state or large city), then server 120 may give relevancy more weight. If the geographical identifier(s) are narrow (e.g., the geographical identifier(s) correspond to a small geographical area, such as a small town, an exact address, or a nearly-exact address), then server 120 may give distance more weight.

Instead of the above-described ranking scheme, server 120 may rank the clusters based on the scores of the documents they contain. When determining the rank of a cluster, server 120 may consider a predetermined number (e.g., one, three, all, etc.) of the highest scoring documents in the cluster. Server 120 may add the scores of these documents together or use another technique, such as an averaging technique, to determine the cluster rank.

Server 120 may then sort and present the result list to the user (act 490). For example, server 120 may sort the clusters based on their rank. Server 120 may then create a result output for each cluster, which may be presented to the user. A result output for a cluster may include the title (which may contain a hypertext link that will direct the user, when selected, to the actual document) and a snippet (i.e., a text excerpt) from the highest-scoring document in the cluster. The result output may also include titles (e.g., hypertext links) of one or more other next-highest-scoring documents, possibly also with a snippet or the URLs associated with these documents. The result output may further include a "See More" option that, when selected by the user, may display titles, snippets, and/or URLs of additional ones of the remaining documents in the cluster. Server 120 may present the result outputs along with a map that illustrates locations corresponding to the addresses associated with the result outputs.

In another implementation, the result output for a cluster may include a business or organization name associated with the cluster, possibly, along with the address associated with the cluster. Server 120 may analyze the words of the documents in the cluster to determine a business or organization corresponding to the address associated with the cluster. The result output, in this implementation, may also include a title, snippet, and/or URL for a predetermined number (e.g., four) of the highest-scoring documents in the cluster. The result output, in this implementation, may further include a "See More" option that, when selected by the user, may display titles, snippets, and/or URLs of additional ones of the remaining documents in the cluster. Server 120 may present the result outputs along with a map that illustrates locations corresponding to the addresses associated with the result outputs.

It may be beneficial to note that a good result may not necessarily include the word(s) making up the geographical identifier(s). In other words, a good result may be associated with a location different from the location of the geographical identifier(s) (though still within the area of interest). It may also be beneficial to note that for a document to be excluded from the result list, the document may not be associated with an address located within the area of interest or any of the keyword(s) provided by the user.

EXAMPLE

Assume that a user desires to find restaurants that serve pizza in the Palo Alto area. The user may access a server using conventional web browser software. Assume that the user provides the following search query: "pizza Palo Alto." The server may recognize the search query as a search for a business or organization in a certain area based at least in part on the presence of one or more keywords ("pizza") and one or more geographical identifiers ("Palo Alto").

Figure 5:
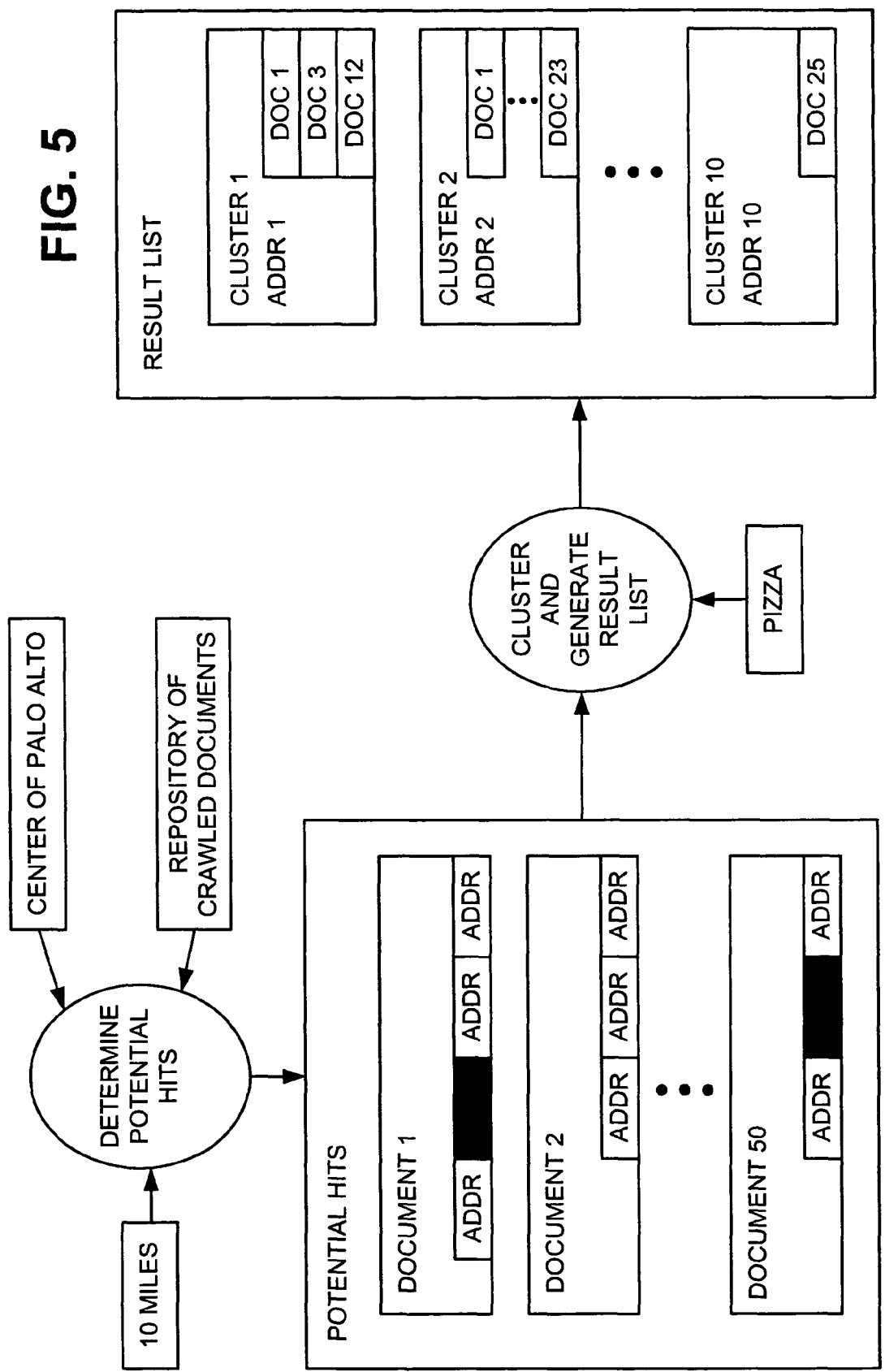
FIG. 5 is a functional block diagram of a portion of a server according to this exemplary implementation consistent with the principles of the invention.

FIG. 5 is a functional block diagram of a portion of the server according to this exemplary implementation consistent with the principles of the invention. The server may determine the geographic center of Palo Alto, possibly in terms of its latitude and longitude coordinates. The server may then identify the area of interest. Assume that the radius is set at 10 miles. The server may determine the area of interest to include the area within a circle centered on the geographic center of Palo Alto with a 10 mile radius.

The server may analyze documents from the repository of crawled documents to identify documents that are associated with one or more addresses located within the area of interest as potential hits. Assume that the potential hits include 50 documents: documents 1 through 50. Some of these documents may be associated with more than one address located within the area of interest. For example, document 1 is associated with four addresses, three of which are located within the area of interest. The shaded block indicates an address that is not located within the area of interest. Similarly, document 2 is associated with three addresses, all of which are located within the area of interest. Document 50 is associated with three addresses, two of which are located within the area of interest.

The server may then identify which of documents 1 though 50 include the keyword "pizza." For example, the server may analyze the words within the documents and determine whether any of these words match the keyword "pizza." Documents that include the word "pizza" may be classified as relevant results. Assume that only documents 1 through 25 include the word "pizza" and, thus, make up the relevant results.

The server may score the relevant results based, for example, on distance and/or relevancy. Assume that document 1 contains an address that is closest to the geographic center of Palo Alto and includes the word "pizza" in a prominent place, like its title. The server may then score document 1 higher than the rest of the documents. Assume further that document 25 contains a single address that is furthest from the geographic center and includes the word "pizza" in very small print. The server may score document 25 lower than the rest of the documents.

The server may cluster documents 1 through 25 based on the addresses they contain. The server may sort the documents based on their scores and consider an address associated with one of the documents (e.g., document 1) to determine whether there are any other documents that are associated with this same address. Assume that documents 3 and 12 are associated with the same address. The server may cluster documents 1, 3, and 12 as being associated with the same address.

The server may then consider another address, such as another address associated with document 1 or another document. The server may then determine whether there are any other documents that are associated with this address. Assume that there are several documents that are associated with the address of which document 25 is one. The server may then cluster documents 1, . . . , 25 as being associated with the same address.

The server may continue this process until no additional clusters can be formed. There should be one cluster formed for each distinct address contained in one or more of documents 1 through 25. Assume that there are 10 distinct addresses and, thus, 10 clusters formed. As shown in FIG. 5, some of the clusters may include the same documents. For example, both clusters 1 and 2 include document 1.

Figure 6A:
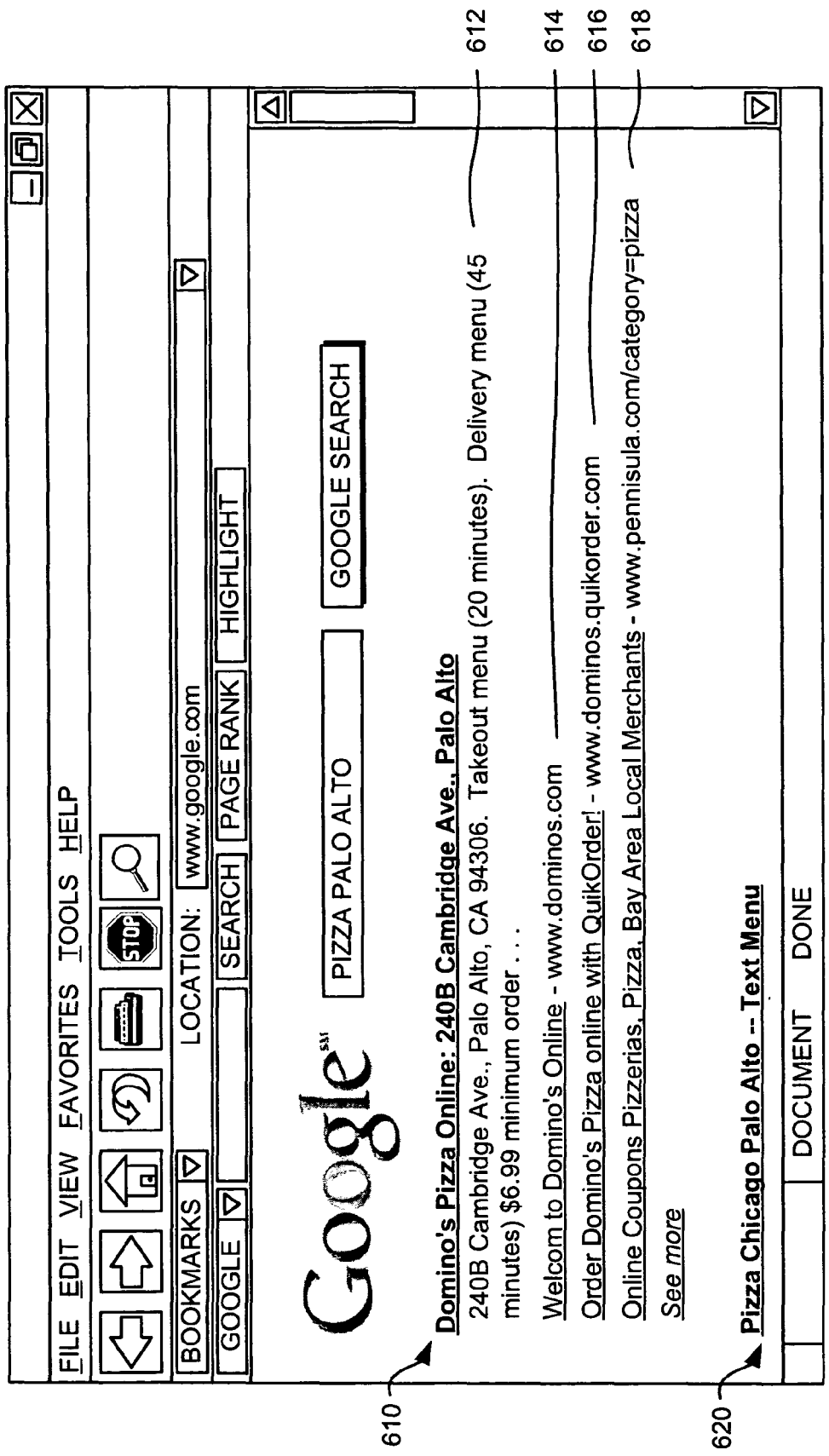
FIG. 6A is a diagram of an exemplary result list according to an implementation consistent with the principles of the invention.

The server may then rank and sort the clusters to form a result list and present the result list to the user. FIG. 6A is a diagram of an exemplary result list according to an implementation consistent with the principles of the invention. As shown in FIG. 6A, the result list contains two result outputs 610 and 620, corresponding to two clusters. Result output 610 refers to four documents 612, 614, 616, and 618 in the cluster. Document 612 may correspond to the highest-scoring document in the cluster. For document 612, the server may include the title and a snippet. Documents 614-618 may correspond to lesser-scoring documents. As shown in FIG. 6A, the server may include the title and/or the URL associated with these documents.

Figure 6B:
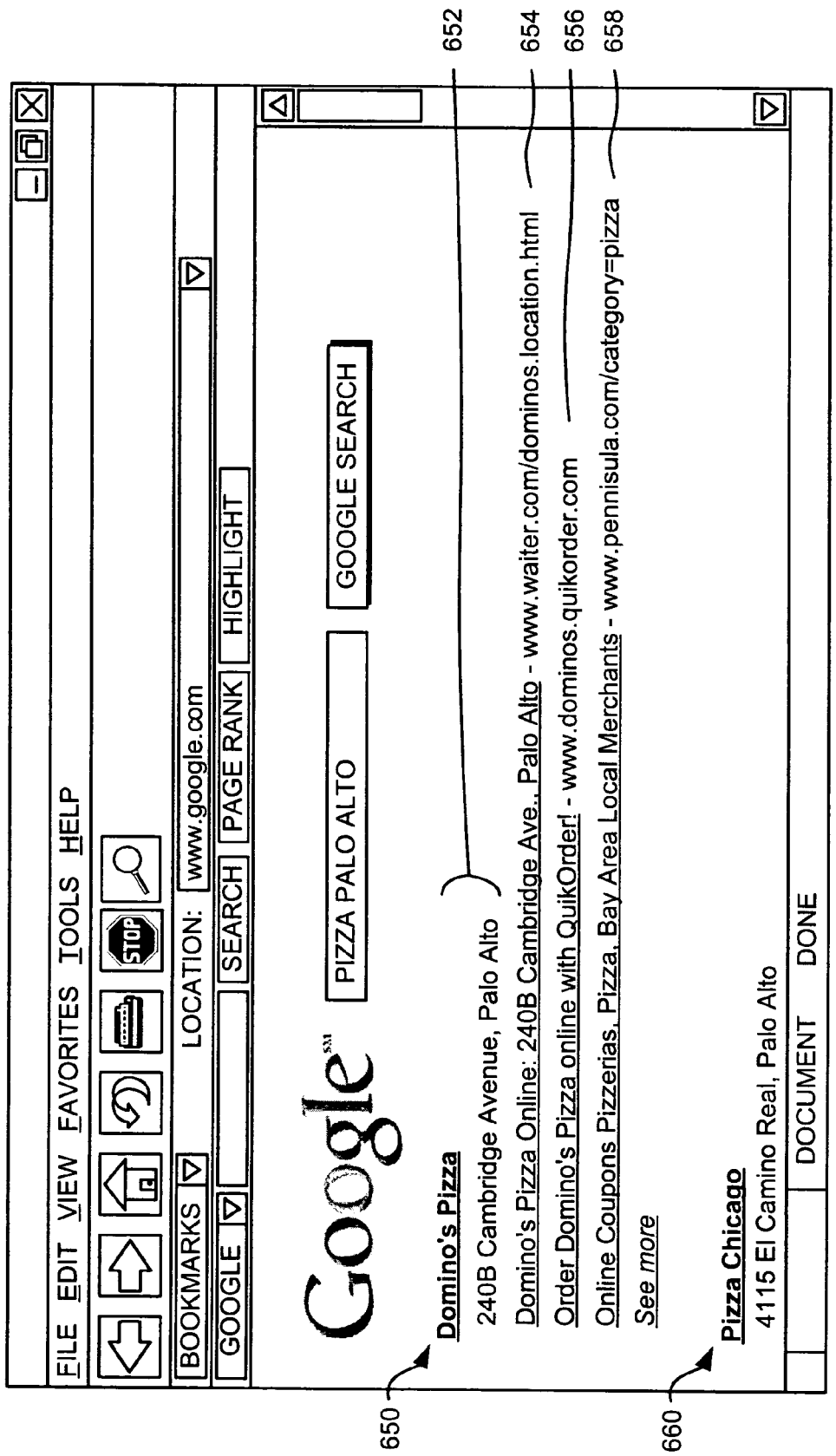
FIG. 6B is a diagram of an exemplary result list according to another implementation consistent with the principles of the invention.

FIG. 6B is a diagram of an exemplary result list according to another implementation consistent with the principles of the invention. As shown in FIG. 6B, the result list contains two result outputs 650 and 660, corresponding to two clusters. Result output 650 includes a business name and, possibly, the address associated with the cluster 652 and refers to three documents 654, 656, and 658 in the cluster. Documents 654-658 may be ordered by their scores. As shown in FIG. 6B, the server may include the title and/or the URL associated with these documents.

Conclusion

Systems and methods consistent with the principles of the invention cluster search results based on locations (or telephone numbers) of interest to users. The users might provide data associated with a business or organization and, possibly, a location of the business or organization. The users might provide the location data as broadly or narrowly as they desire. They may also dynamically broaden or narrow the location data to obtain more or fewer results.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. For example, while series of acts have been described with regard to FIGS. 4A and 4B, the order of the acts may be modified in other implementations consistent with the principles of the invention. Also, non-dependent acts may be performed in parallel.

Also, clustering has been described thus far as grouping documents based on the addresses with which they are associated. In other implementations consistent with the principles of the invention, clustering may be performed to group documents based on the telephone numbers with which they are associated. For example, a user might provide a partial telephone number in the search query. The server may identify documents that are associated with the partial telephone number and match any keyword(s) also included in the search query. The server may then cluster the documents based on the telephone numbers with which they are associated and present the clusters as search results to the user.

Further, while the preceding description focused on generating search results that are meaningful to a user, it is not so limited. For example, the previously-described acts may be used to target, and possibly cluster, advertisements to users. The keyword(s) and geographical identifier(s) may be used to determine interests and locations of the users. The server may use these interests and locations to identify advertisements to present to the users along with the search results. In the example in which a user is searching for restaurants that serve pizza in the Palo Alto area, the server might present the user with advertisements regarding other restaurants (maybe ones not serving pizza) in the Palo Alto area (or within the area of interest). These, or other, advertisements may be clustered in a manner similar to that described above.

What is claimed is:

1. A computer-implemented method, comprising:
receiving a search query that includes one or more keywords;
obtaining a geographical identifier;
determining a geographic location based, at least in part, on the geographical identifier,
identifying an area of interest within a certain distance of the geographic location, where the certain distance is dynamically determined based, at least in part, on the one or more keywords;
identifying documents that are associated with addresses located within the area of interest;
determining ones of the identified documents that match the one or more keywords as relevant documents;
grouping the relevant documents into one or more clusters based, at least in part, on the addresses associated with the relevant documents, each of the one or more clusters corresponding to a different one of the addresses;
scoring the relevant documents based on at least one of a distance factor or a relevancy factor, the distance factor for a first of the relevant documents being based, at least in part, on a distance that an address associated with the first of the relevant documents is from the geographic center of the area of interest and the relevancy factor for a second of the relevant documents being based, at least in part, on a number of the one or more keywords present in the second of the relevant documents or a measure of how prominently the one or more keywords appear in the second of the relevant documents;
ranking the relevant documents within each of the one or more clusters based on the scoring; and
presenting the one or more clusters.

2. The method of claim 1, wherein the geographical identifier is received as part of the search query.

3. The method of claim 1, wherein the geographical identifier is inferred independent of the search query.

4. The method of claim 1, wherein the one or more keywords relate to a business or organization.

5. The method of claim 4, wherein the geographical identifier includes location-specific information that approximately identifies a location of the business or organization.

6. The method of claim 1, wherein the geographical identifier includes at least one of a partial address, a partial telephone number, an entire address, or an entire telephone number.

7. The method of claim 1, wherein grouping the relevant documents into one or more clusters includes:

identifying a first address associated with a first one of the relevant documents,
determining one or more second ones of the relevant documents that are also associated with the first address, and
grouping the first one of the relevant documents and the one or more second relevant documents into a cluster.

8. The method of claim 1, wherein grouping the relevant documents into one or more clusters includes:
placing each of the relevant documents into at least one cluster.

9. The method of claim 1, wherein grouping the relevant documents into one or more clusters includes:
placing at least one of the relevant documents into a plurality of the clusters.

10. The method of claim 1, wherein scoring the relevant documents based on at least one of a distance factor or a relevancy factor further comprises:
scoring the relevant documents based on a weighting of the distance factor and the relevancy factor, wherein the distance factor and the relevancy factor are weighted differently based, at least in part, on a specificity of the geographical identifier.

11. The method of claim 1, wherein presenting the one or more clusters includes:
forming a result output for a first one of the one or more clusters, the result output including at least one of a title or a snippet for one of the relevant documents in the first one of the one or more clusters.

12. The method of claim 1, wherein presenting the one or more clusters includes:
forming a result output for a first one of the one or more clusters, the result output including a name of a business or a title for at least one of the relevant documents in the first one of the one or more clusters.

13. A system, comprising:
means for receiving a search query that includes one or more keywords;
means for identifying a geographical location;
means for determining a geographical center of the geographical location;
means for identifying locations within a certain distance of the geographical center as a geographical area of interest, where the certain distance is dynamically set based, at least in part, on the one or more keywords;
means for identifying documents that are associated with addresses located within the geographical area of interest;
means for determining relevant ones of the identified documents, as relevant documents, based, at least in part, on the search query;
means for forming the relevant documents into one or more clusters based, at least in part, on the addresses associated with the relevant documents, each of the one or more clusters corresponding to a different one of the addresses;
means for scoring the relevant documents based on at least one of a distance factor or a relevancy factor, the distance factor for a first of the relevant documents being based, at least in part, on a distance that an address associated with the first of the relevant documents is from the geographic center and the relevancy factor for a second of the relevant documents being based, at least in part, on a number of the one or more keywords present in the second of the relevant documents or a measure of how prominently the one or more keywords appear in the second of the relevant documents; and means for ranking the relevant documents within each of the one or more clusters based on the scoring.

14. The system of claim 13, where the geographical location is received as part of the search query.

15. The system of claim 13, where the geographical location is inferred independent of the search query.

16. A system comprising:
one or more processors to:
receive a search query that includes one or more keywords;
obtain a geographical identifier;
determine a geographic location based, at least in part, on the geographical identifier,
identify an area of interest within a certain distance of the geographic location, where the certain distance is dynamically determined based, at least in part, on the one or more keywords;
identify documents that are associated with addresses located within the area of interest;
determine ones of the identified documents that match the one or more keywords as relevant documents;
group the relevant documents into one or more clusters based, at least in part, on the addresses associated with the relevant documents, each of the one or more clusters corresponding to a different one of the addresses;
score the relevant documents based on at least one of a distance factor or a relevancy factor, the distance factor for a first of the relevant documents being based, at least in part, on a distance that an address associated with the first of the relevant documents is from the geographic center of the area of interest and the relevancy factor for a second of the relevant documents being based, at least in part, on a number of the one or more keywords present in the second of the relevant documents or a measure of how prominently the one or more keywords appear in the second of the relevant documents;
rank the relevant documents within each of the one or more clusters based, at least in part, on the scoring; and
present the one or more clusters.

17. The system of claim 16, where the geographical identifier is received as part of the search query.

18. The system of claim 16, where the geographical identifier is inferred independent of the search query.

19. The system of claim 16, where the one or more keywords relate to a business or organization.

20. The system of claim 19, where the geographical identifier includes location-specific information that approximately identifies a location of the business or organization.

21. The system of claim 16, where the geographical identifier includes at least one of a partial address, a partial telephone number, an entire address, or an entire telephone number.

22. The system of claim 16, where, when grouping the relevant documents into one or more clusters, the one or more processors are further to:
identify a first address associated with a first one of the relevant documents,
determine one or more second ones of the relevant documents that are also associated with the first address, and
group the first of the relevant documents and the one or more second relevant documents into a cluster.

23. The system of claim 16, where, when grouping the relevant documents into one or more clusters, the one or more processors are further to:
place each of the relevant documents into at least one cluster.

24. The system of claim 16, where, when grouping the relevant documents into one or more clusters, the one or more processors are further to:
place at least one of the relevant documents into a plurality of the clusters.

25. The system of claim 16, where, when scoring the relevant documents based on at least one of a distance factor or a relevancy factor, the one or more processors are further to:
score the relevant documents based on a weighting of the distance factor and the relevancy factor, wherein the distance factor and the relevancy factor are weighted differently based, at least in part, on a specificity of the geographical identifier.

26. The system of claim 16, where, when presenting the one or more clusters, the one or more processors are further to:
form a result output for a first one of the one or more clusters, the result output including at least one of a title or a snippet for one of the relevant documents in the first one of the one or more clusters.

27. The system of claim 16, where, when presenting the one or more clusters, the one or more processors are further to:
form a result output for a first one of the one or more clusters, the result output including a name of a business or a title for at least one of the relevant documents in the first one of the one or more clusters.

* * * * *